United States Patent
Kagata et al.

[11] Patent Number: 6,154,356
[45] Date of Patent: *Nov. 28, 2000

[54] LAMINATED CERAMIC DEVICE

[75] Inventors: Hiroshi Kagata, Osaka; Kouji Kawakita, Kyoto; Tatsuya Inoue, Osaka; Hiroshi Sogou, Hyogo, all of Japan

[73] Assignee: Matsushita Electric Industrial Co., Ltd., Osaka, Japan

[*] Notice: This patent issued on a continued prosecution application filed under 37 CFR 1.53(d), and is subject to the twenty year patent term provisions of 35 U.S.C. 154(a)(2).

[21] Appl. No.: 09/150,887
[22] Filed: Sep. 10, 1998

[30] Foreign Application Priority Data

Oct. 2, 1997 [JP] Japan ................... 9-269790

[51] Int. Cl.$^7$ ............. H01G 4/005; H01G 4/06
[52] U.S. Cl. .............. 361/303; 361/301.4; 361/321.2
[58] Field of Search ................. 361/301.1, 301.4, 361/303, 304, 306.1, 306.3, 307, 311, 313, 320, 321.1–321.5

[56] References Cited

U.S. PATENT DOCUMENTS

| | | | |
|---|---|---|---|
| 4,482,933 | 11/1984 | Alexander | 29/25.42 |
| 4,579,594 | 4/1986 | Nanao et al. | 106/287.17 |
| 4,584,074 | 4/1986 | Sterling et al. | 204/488 |
| 4,599,677 | 7/1986 | Lawless | 252/519.15 |
| 4,811,164 | 3/1989 | Ling et al. | 29/25.42 |
| 5,668,694 | 9/1997 | Sato et al. | 361/321.4 |

FOREIGN PATENT DOCUMENTS 5-343943  12/1993  Japan .

Primary Examiner—Dean A. Reichard
Assistant Examiner—Eric W. Thomas
Attorney, Agent, or Firm—Merchant & Gould P.C.

[57] ABSTRACT

A laminated ceramic device formed by laminating ceramics and conductive metals having a conductor section at a part of at least one of its upper and lower surfaces, in which the difference in level between the conductor section and the section other than the conductor section is smaller than the thickness of the conductor section. Consequently, even in the case of arranging the pattern conductors on both the upper and the lower surfaces of the device, a laminated ceramic device can be obtained in which pattern conductors can be arranged with high accuracy at low cost, no special care is required in the case of polishing, and the thickness accuracy and the bond strength of electrodes are high.

8 Claims, 7 Drawing Sheets

LAMINATED CERAMIC DEVICE

FIELD OF THE INVENTION

The present invention relates to a laminated ceramic device obtained by firing ceramics and conductors simultaneously and to a method of manufacturing the same.

BACKGROUND OF THE INVENTION

Recently, laminated ceramic devices that are formed by laminating ceramics and arranging conductor patterns inside and outside the laminated ceramics without molding the ceramics themselves into a complex shape and that can be made small without eliminating various electronic properties of the ceramics have been utilized in various fields.

Typical laminated ceramic devices include a laminated ceramic condenser in which dielectric ceramics are used. Nowadays, laminated ceramic condensers with various capacities and sizes are delivered from electronic component manufacturers that are engaged actively in developing condensers with high capacity and a small size.

Recently, this laminating technique also has been used for manufacturing a resonant device such as a band-pass filter for a microwave band used in a portable telephone. Conventionally, such a resonant device was formed by molding dielectric ceramics into a cylindrical shape and metallizing its outside, thus obtaining a coaxial resonator. Further, a plurality of the coaxial resonators are arranged to form a band-pass filter. On the contrary, a laminated band-pass filter is constructed by forming conductor patterns, which are electrically equivalent to a coaxial filter, inside dielectric ceramics by the laminating technique. The laminated band-pass filter can be made very small compared to a conventional coaxial type. Therefore, the laminated band-pass filter has been an essential device for making a portable telephone terminal small these days. In addition, dielectric ceramics have been applied to laminated devices, which have been adopted in an isolator and a circulator, or in a field of a laminated ceramic multilayer substrate using ceramics having relatively low specific inductive capacity and the like.

Similarly, in a field of piezoelectric ceramics, the piezoelectric property has been obtained by forming electrodes outside a device conventionally. However, recently, by the laminating technique, a method for making the device small by forming a conductor inside piezoelectric ceramics, a method for obtaining higher output without changing a device size, a method for reducing power consumption, and the like have been proposed. A method for applying such methods to a member for an acceleration sensor, a flat-type resonant chopper, or the like has been proposed.

However, in a conventional laminated ceramic device, the thickness of each conductor section on upper and lower surfaces is almost the same as the difference in level between the conductor section and the section where no conductor section is formed as disclosed in Unexamined Japanese Patent Application Tokkai Hei 5-343943. In such a structure, when polishing the device after forming the conductor section for the purpose of characteristics adjustment or the like, the conductor section is polished as well. Consequently, there has been a problem that the conductor section becomes very thin or the conductor section is completely removed and the like. Moreover, even if these problems are avoided, in the case of using a conventional structure of a conductor section formed on each of the upper and lower surfaces, such problems that the conductor section comes off from the part having a big difference in level when handling it later and the like occur, which have caused defects.

In a method of manufacturing a conventional device, since conductor sections on the upper and lower surfaces are formed after sintering the ceramics, there have been such problems that it is difficult to arrange the position relationship between conductors inside ceramics and conductors on the upper and the lower surfaces accurately and that a manufacturing cost is high.

SUMMARY OF THE INVENTION

The present invention seeks to solve the problems in conventional laminated ceramic devices mentioned above and to provide a laminated ceramic device in which pattern conductors can be arranged with high accuracy at low cost, no limitation is required in the case of polishing, and the thickness accuracy and the bond strength of electrodes are high, even in the case of arranging the pattern conductors on both the upper and lower surfaces of the device. Another object of the present invention is to provide a method of manufacturing such a laminated ceramic device.

In order to solve the problems mentioned above, the following structures are applied to the present invention.

A laminated ceramic device according to a first structure of the present invention is formed by laminating ceramics and conductive metals. The laminated ceramic device has a conductor section at a part of at least one of its upper and lower surfaces. The difference in level between the conductor section and the section other than the conductor section is smaller than the thickness of the conductor section. According to the first structure, the difference in level between the conductor section and the section not including conductors (a non-conductor section) is smaller than the thickness of the conductor section. Therefore, a laminated ceramic device can be obtained with high thickness accuracy in which the bond strength of conductive electrodes is high and no limitation is required in the case of polishing.

A laminated ceramic device according to a second structure of the present invention is formed by laminating ceramics and conductive metals. The laminated ceramic device has a conductor section at a part of each of its upper and lower surfaces. The difference in level between the conductor section and the section other than the conductor section on each of the upper and the lower surfaces is smaller than the thickness of the conductor section. According to the second structure, the conductor section on each of the upper and the lower surfaces is formed so that the difference in level between the conductor section and the non-conductor section is smaller than the thickness of the conductor section. Therefore, the bond strength of both conductor sections on the upper and the lower surfaces is high and no limitation is required in the case of polishing.

In the first or the second structure described above, it is preferable that the conductor section is higher than the section other than the conductor section.

A laminated ceramic device according to a third structure of the present invention is formed by laminating ceramics and conductive metals. The laminated ceramic device has a conductor section at a part of at least one of its upper and lower surfaces. The conductor section has substantially the same height as that of the section other than the conductor section. According to the third structure, the conductor section and the nonconductor section are formed so as to have substantially the same height, i.e. so that the surfaces of both the conductor section and the non-conductor section are coplanar. Therefore, a laminated ceramic device can be obtained with high thickness accuracy that becomes increasingly less susceptible to conditions in the case of polishing and in which the bond strength of conductive electrodes becomes higher. Furthermore, mounting of the electron device or mounting of electronic parts or the like on the electron device becomes easy.

A laminated ceramic device according to a fourth structure of the present invention is formed by laminating ceramics and conductive metals. The laminated ceramic device has a conductor section at a part of each of its upper and lower surfaces. The conductor section has substantially the same height as that of the section other than the conductor section on each of the upper and the lower surfaces. According to the fourth structure, the conductor section and the non-conductor section are formed so as to have substantially the same height on each of the upper and the lower surfaces. Therefore, the bond strength on both the upper and the lower surfaces is high and no limitation is required in the case of polishing. Furthermore, it becomes easy to mount other electronic parts or the like on any of the upper and the lower surfaces of the electron device or to mount the electron device with any of its upper and lower surfaces facing a part where the electron device is mounted.

In the first to fourth structures described above, dielectric ceramics can be used as the ceramics. In this case, it is preferable that the specific inductive capacity of the dielectric ceramics is at least 10, so that a small-type high performance electron device can be obtained.

In the first to fourth structures described above, piezoelectric ceramics may be used as the ceramics.

A method of manufacturing laminated ceramic devices of the present invention comprises: a process including steps of printing a conductive paste on a base film with a predetermined pattern, drying the conductive paste, and arranging a ceramic green-sheet so as to cover the conductor pattern formed of the conductive paste; a printing and laminating process; a pressure bonding and transferring process; and a firing process. In the printing and laminating process, at least one step selected from a step of printing a conductive paste on the ceramic green-sheet with a predetermined pattern and a step of laminating a predetermined number of ceramic green-sheets is performed at least once. In the pressure bonding and transferring process, after bonding the laminated body obtained in the printing and laminating process including the base film by applying pressure, the base film is stripped off, thus transferring the conductive pattern to the laminated body. In the firing process, the laminated body mentioned above is fired. According to the manufacturing method described above, the conductive paste is formed before the firing process. Therefore, conductor sections (electrodes) can be arranged on both the upper and the lower surfaces of the device with high accuracy. Furthermore, laminated ceramic devices in which the difference in level between conductor section formed on its upper and lower surfaces and non-conductor section is smaller than the thickness of the conductor section can be obtained easily. Moreover, since the conductor sections can be formed on both the upper and the lower surfaces during the laminating process, the manufacturing cost can be reduced compared to the case of forming each conductor section separately. Even in the case where a polarizing operation is required, by properly selecting the structure of electrode patterns, the polarization can be conducted before cutting the laminated body into pieces. Therefore, it is not necessary to polarize the pieces one by one, thus considerably decreasing the number of processes in manufacturing.

In the manufacturing method mentioned above, it is preferable that the conductive paste is printed on at least one surface of the ceramic green-sheet with a predetermined pattern. When laminating a ceramic green-sheet on which a conductive paste has been printed in advance, the decrease in insulation resistance and the occurrence of initial short-circuit can be prevented compared to the case of printing a conductive paste after laminating a ceramic green-sheet. Consequently, electron devices with high reliability can be obtained.

DETAILED DESCRIPTION OF THE INVENTION

Embodiments of the present invention will be explained with reference to drawings as follows.

Figure 1:
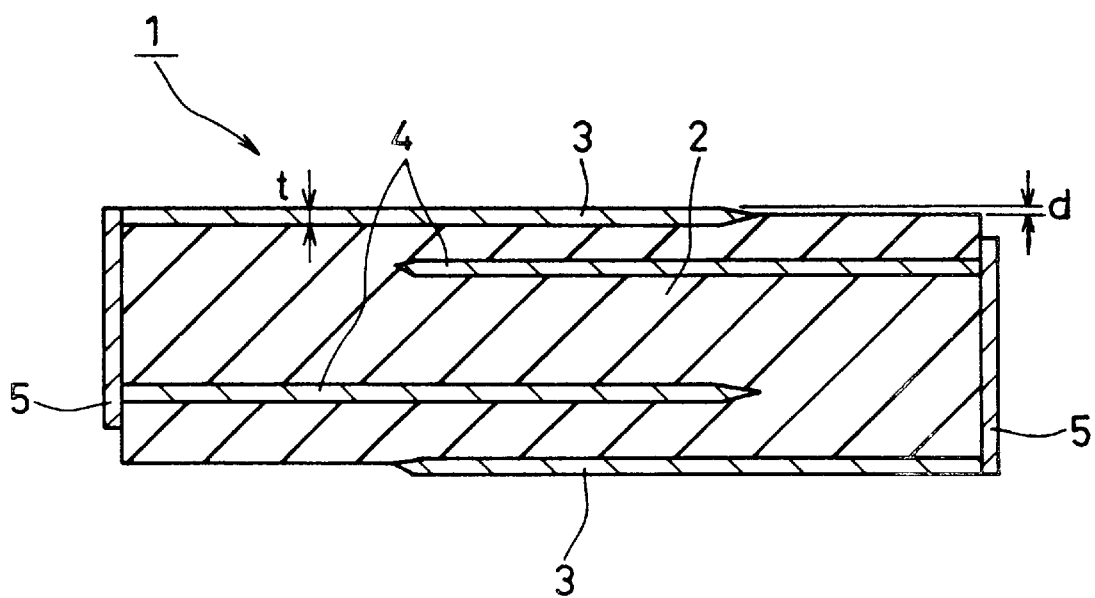
FIG. 1 is a cross-sectional view in the thickness direction showing a schematic view of an example of a laminated structure of a laminated ceramic device of the present invention.

FIG. 1 is a cross-sectional view in the thickness direction showing a schematic view of an example of a laminated structure of a laminated ceramic device of the present invention. A laminated ceramic device 1 is formed by laminating ceramics 2 and inner conductive metals 4. The laminated ceramic device 1 comprises conductor sections 3 at a part of its upper and lower surfaces as surface electrodes, and side electrodes 5 formed on its side faces.

In the laminated ceramic device of the present invention, the conductor section 3 is formed on at least one of the upper and the lower surfaces, and the difference d in level between the conductor section 3 and the section other than the conductor section is smaller than the thickness t of the conductor section 3. Due to this configuration, even if conducting barrel polishing or polishing of both the upper and the lower surfaces is carried out in order to improve the thickness accuracy, the conductor section is not polished first to be too thin or to be removed. Therefore, the laminated ceramic device is less susceptible to conditions in the case of polishing, thus obtaining a device with high thickness accuracy. Furthermore, the bond strength of the conductor sections can be increased. In addition, pattern conductors can be easily arranged on the upper and the lower surfaces of the device with high accuracy. It is preferable that the ratio d/t of the difference d in level and the thickness t of the conductor section 3 is at least 0 but less than 1, more preferably, at least 0 but less than 0.8. When the ratio d/t exceeds the upper limit, the device becomes susceptible to the conditions in the case of polishing the conductor sections. Consequently, it becomes difficult to obtain a device with high thickness accuracy and the bond strength of the conductor sections decreases.

Figure 2:
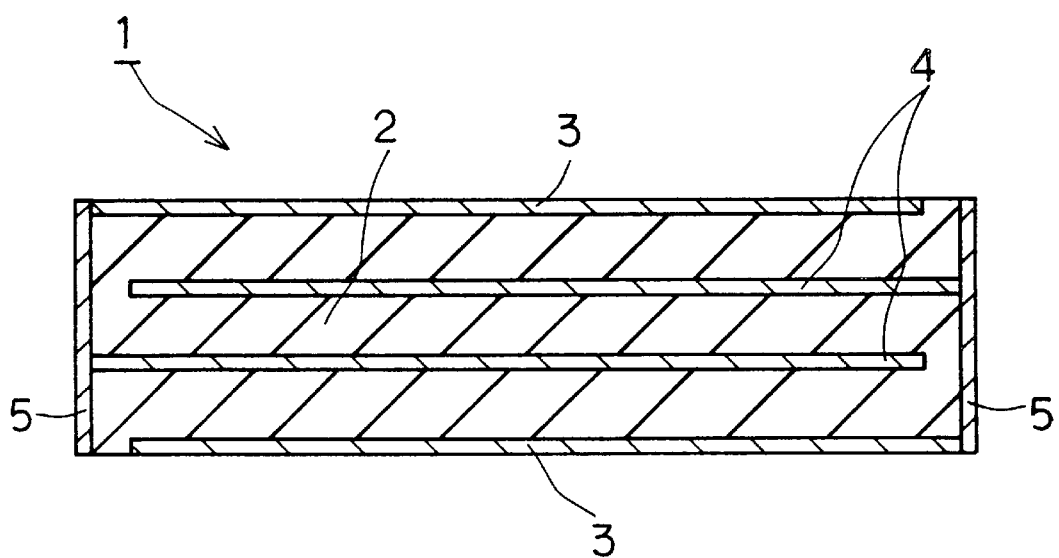
FIG. 2 is a cross-sectional view in the thickness direction showing a schematic view of another example of a laminated structure of a laminated ceramic device of the present invention.

Needless to say, as long as the difference din level between the conductor section 3 and the section other than the conductor section is smaller than the thickness t of the conductor section 3, the case of d=0 is acceptable. FIG. 2 shows a cross-sectional view in the thickness direction showing a schematic view of an example of a laminated structure of such a laminated ceramic device. In FIG. 2, members having the same function as in FIG. 1 are numbered with the same reference numbers as in FIG. 1 and the detail description of the members are omitted. By forming a conductor section 3 and a non-conductor section so as to be almost the same height and so as to have no difference din level as shown in FIG. 2, a laminated ceramic device becomes increasingly less susceptible to the conditions in the case of polishing and the bond strength of the conductor sections increases. In addition, mounting of or mounting other parts on the laminated ceramic device becomes easy.

When forming the conductor section 3 at a part of each of upper and lower surfaces of an electron device, the above effects can be obtained if the conductor section on either surface satisfies the above structure conditions of the present invention. However, it is preferable that the conductor sections on both the upper and the lower surfaces satisfy the above structure conditions of the present invention, since the effects of the present invention are revealed still more outstandingly. When forming the conductor sections on both the upper and the lower surfaces, the conductor sections and the non-conductor sections may be formed so that one of the surfaces has almost no difference in level d as shown in FIG. 2 and the other has a predetermined difference in level d as shown in FIG. 1.

The ceramic material used in the present invention is not particularly limited. The ceramic material is preferably a material that can be simultaneously fired with silver, copper, gold, platinum, palladium, nickel, or an alloy thereof. For example, dielectric $Bi_2O_3$—$CaO$—$Nb_2O_5$ -based ceramic, $Bi_2O_3$—$Nb_2O_5$-based ceramic, $Bi_2O_3$—$CaO$—$ZnO$—$Nb_2O_5$ -based ceramic, $BaO$—$NdO$—$TiO_2$—glass -based ceramic, $CaO$—$ZrO_2$—$TiO_2$—glass -based ceramic, or the like, or piezoelectric $PbO$—$ZrO_2$—$TiO_2$ -based ceramic or the like can be preferably used. When dielectric ceramics are used and the specific inductive capacity is preferably at least 10, more preferably at least 15, and most preferably at least 20, the electron device can be easily made small. In addition to the materials mentioned above, ceramics for a circuit material such as glass-ceramic alumina based ceramics may be used.

The conductor is not particularly limited as long as it is a metal with conductivity. Examples of the conductor include gold, silver, copper, platinum, palladium, nickel, or mixtures thereof. The thickness of the conductor section t (see FIG. 1) is not particularly limited, but is preferably about 2 to 50 μm.

The inner-conductor shape in the laminated ceramic device of the present invention is not particularly limited. Any shape can be used as long as it is a pattern shape according to the required characteristics. Moreover, the number of layers laminated is not limited to a specific number as long as it is allowable in the method. When a part of at least one of the upper and the lower surfaces is a conductor section and the difference in level between the conductor section and the section other than the conductor section is smaller than the thickness of the conductor section on the same surface, any outer-conductor shapes can be used. Furthermore, it does not matter whether conductors are provided on side faces or whether the conductor sections on the side faces and the conductor sections on the upper and the lower surfaces are electrically connected.

The size of the laminated ceramic device of the present invention is not particularly limited. Generally, a shape suitable for a small-type device on the order of a few millimeters is used. However, it does not matter whether the size is larger or smaller than that as long as it is allowable in the method. Common outer shapes of the device include a prismatic shape, a square pole shape, or such a shape without corners. However, any shapes, for example, a convex shape or a concave shape, may be applied and the device may have a through hole at a part.

The base film used in the method of manufacturing the laminated ceramic device of the present invention is not particularly limited. Examples of the base film include a film made of polyethylene terephthalate. The surface of the base film may be treated by, for example, applying a mold release agent.

The methods of arranging and laminating ceramic green-sheets are not particularly limited. Examples of the method include a doctor blade method and a reverse roll method. In this case, when printing a conductive paste at least on one surface of the ceramic green-sheet with a predetermined pattern in advance and then laminating and arranging the ceramic green-sheet, an electron device with high reliability can be obtained. It is conceivable that this is because the conductor component can be prevented from penetrating into the inside of the green-sheet compared to the case of printing a conductive paste after laminating and arranging the ceramic green-sheet.

The pressure at the time of pressure bonding and transferring after laminating the ceramic green-sheets is not particularly limited, as long as the sheets are bonded to each other and the conductive paste on the base film is transferred onto the ceramic with pressure. However, a suitable pressure is about 20–200 MPa. The press can be carried out at a normal temperature, but heat may be added as required.

The firing method is not particularly limited, since it differs depending on the composition and the size of the device. Usually, after the heat treatment at 400–1000° C. for 2–120 hours in order to remove a binder, the firing is conducted at 800–1200° C. for several minutes to tens of hours.

The number of units comprised in the same laminated body also is not particularly limited, but it is preferable to comprise as many units as possible in view of productivity. It does not matter whether the laminated body is cut into pieces before or after the firing. Furthermore, the method of applying outer electrodes on side faces of the device is not particularly limited. Examples of the method include printing using a paste, dipping, vacuum evaporation, and plating.

The application range of the laminated ceramic device of the present invention is not particularly limited. However, when using dielectric ceramics, the laminated ceramic device can be applied to resonators, filters, condensers or the like, and when using piezoelectric ceramics, the laminated ceramic device can be applied to sensors, actuators, filters, vibrators, or the like.

EXAMPLE

Figure 3A:
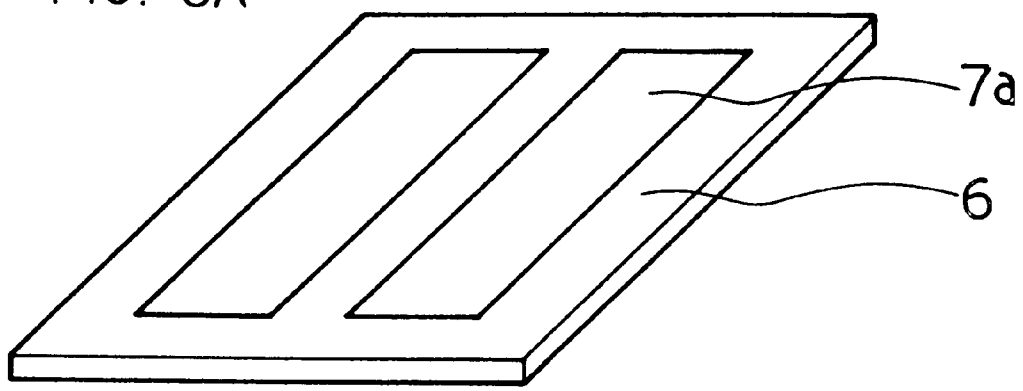
FIG. 3(A)–3(C) are schematic perspective views showing an embodiment of a method of manufacturing a laminated ceramic device of the present invention in a processing order.
Figure 3B:
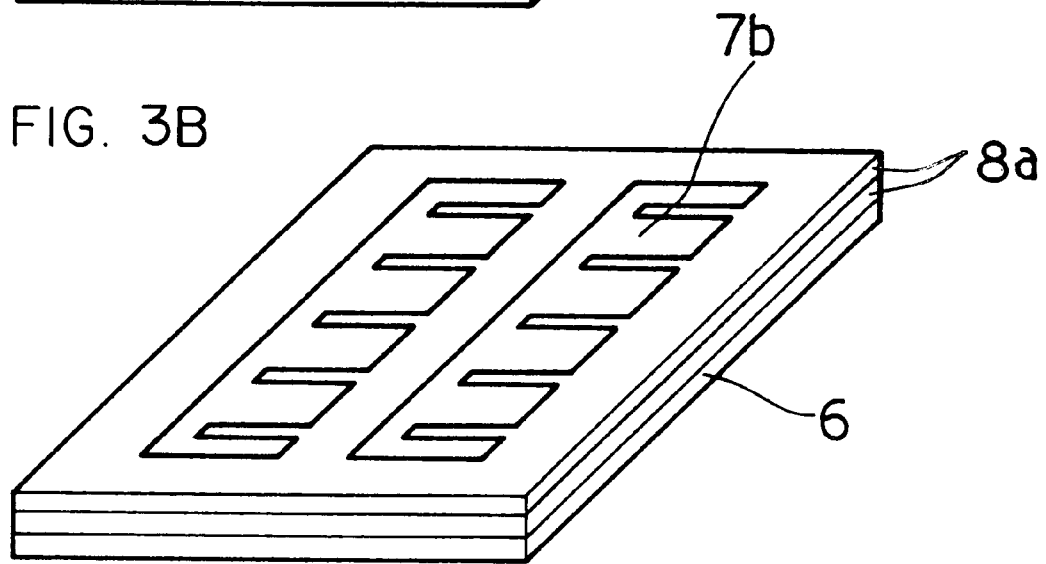
Figure 3C:
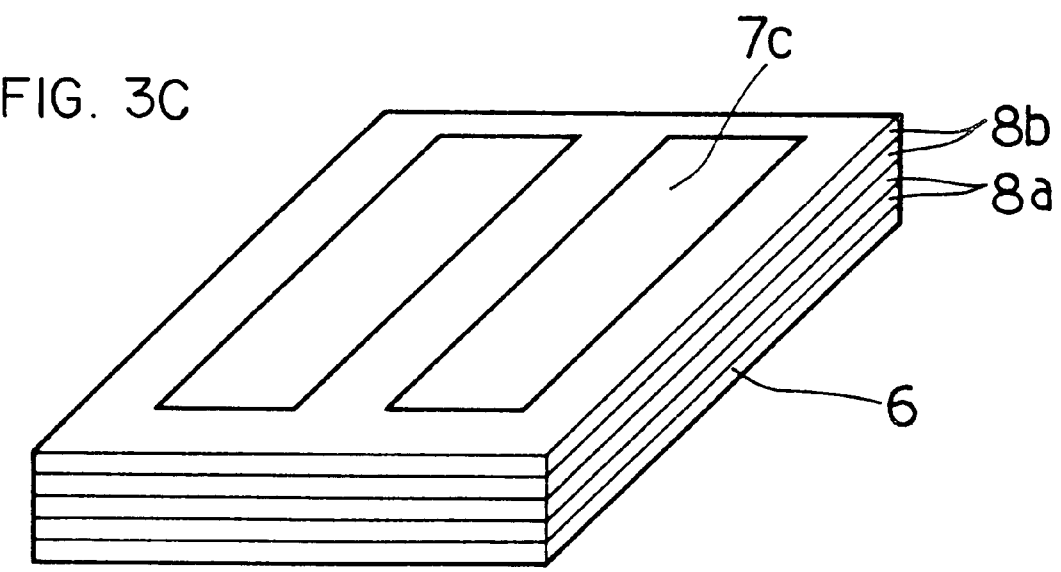
Figure 4A:
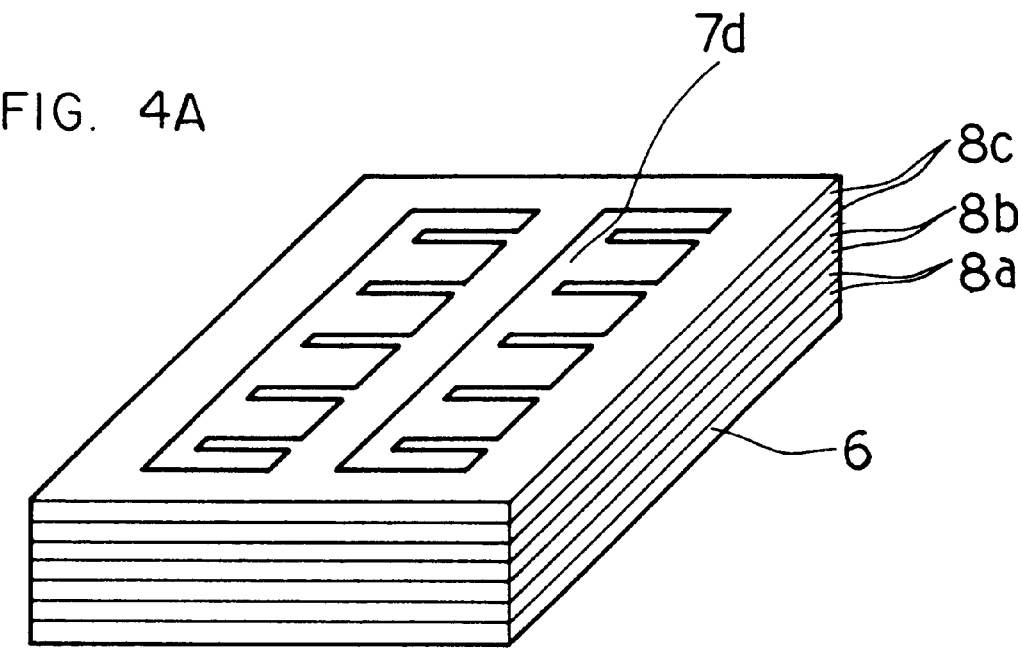
FIG. 4(A)–4(B) are schematic perspective views showing an embodiment of a method of manufacturing a laminated ceramic device of the present invention in a processing order after that of FIG. 3.
Figure 4B:
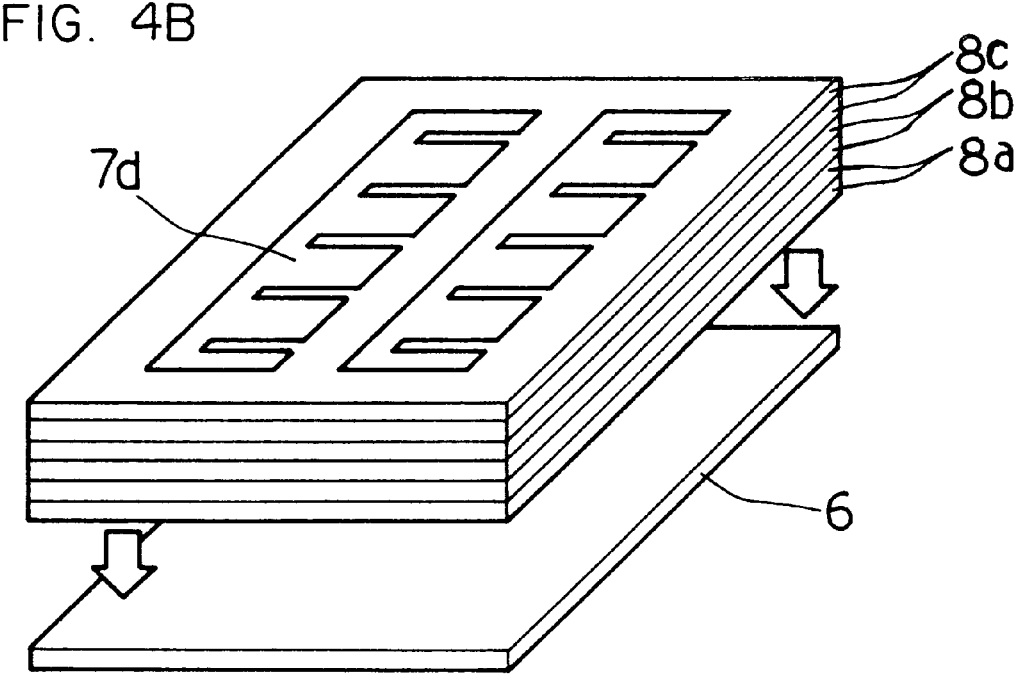
Figure 5:
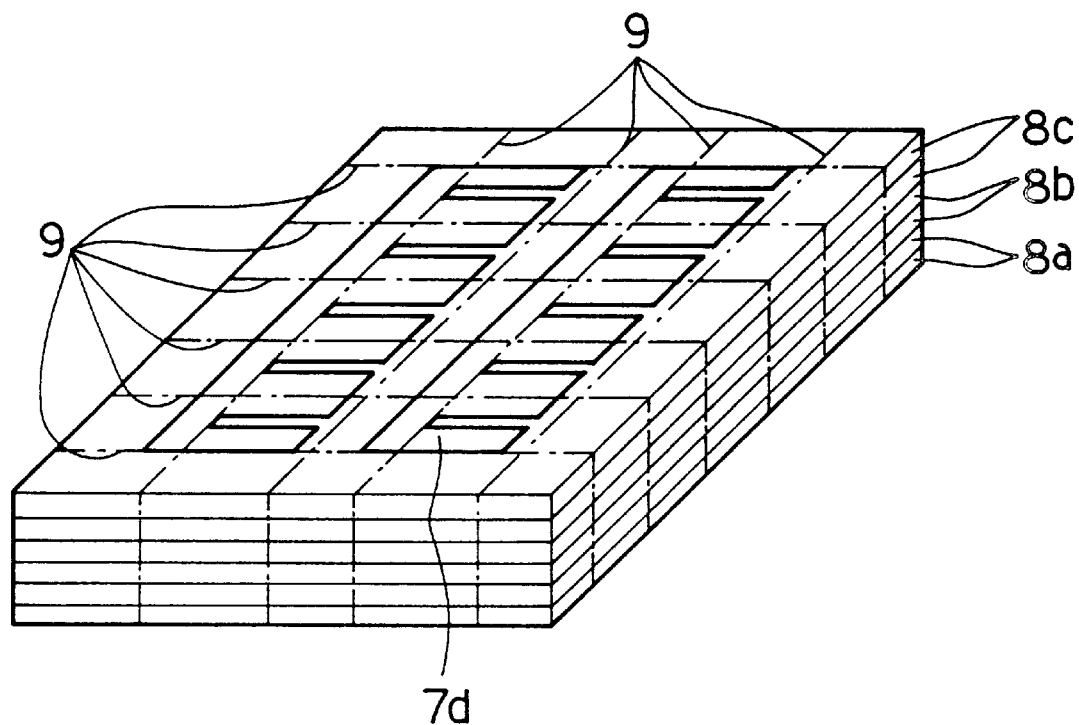
FIG. 5 is a schematic perspective view showing an embodiment of a method of manufacturing a laminated ceramic device of the present invention in a processing order after that of FIG. 4.

Each of FIGS. 3–5 shows a schematic perspective view illustrating an embodiment of a method of manufacturing a member for a laminated acceleration sensor in a processing order as an example of laminated ceramic devices. Based on the drawings, laminated ceramic devices of the present invention and their manufacturing method will be explained in detail as follows.

First, as shown in FIG. 3(A), a film 6 made of polyethylene terephthalate with a mold release agent applied on its surface is prepared and a predetermined electrode pattern is formed on the film 6 by screen printing with a silver-palladium paste 7a. The silver-palladium paste 7a is then dried using a dryer or the like.

As a next step, after laminating the predetermined number of piezoelectric ceramic green-sheets 8a (in FIG. 3(B), 2 sheets), a predetermined electrode pattern is formed by screen printing with a silver-palladium paste 7b as shown in FIG. 3(B).

Similarly, as shown in FIG. 3(C), the predetermined number of piezoelectric ceramic green-sheets 8b are laminated thereon (in FIG. 3(C), 2 sheets) and a predetermined electrode pattern is printed thereon with a silver-palladium paste 7c.

Further, as shown in FIG. 4(A), the predetermined number of piezoelectric ceramic green-sheets 8c are laminated thereon (in FIG. 4(D), 2 sheets) and a predetermined electrode pattern is printed thereon with a silver-palladium paste 7d.

Needless to say, the electrode pattern on each sheet should be arranged so as to be located at a predetermined position. After arranging all these sheets and electrode patterns and bonding them including the film 6 at about 40° C. by applying a pressure of about 40 MPa, the film 6 is stripped off from the laminated body. As a result, the electrode pattern 7a printed on the film 6 is transferred onto the ceramic side (FIG. 4(E)).

Thus, the manufacturing of a laminated body is completed. The polarization is conducted by applying a suitable voltage to a predetermined part of the electrode in this laminated body.

Figure 6:
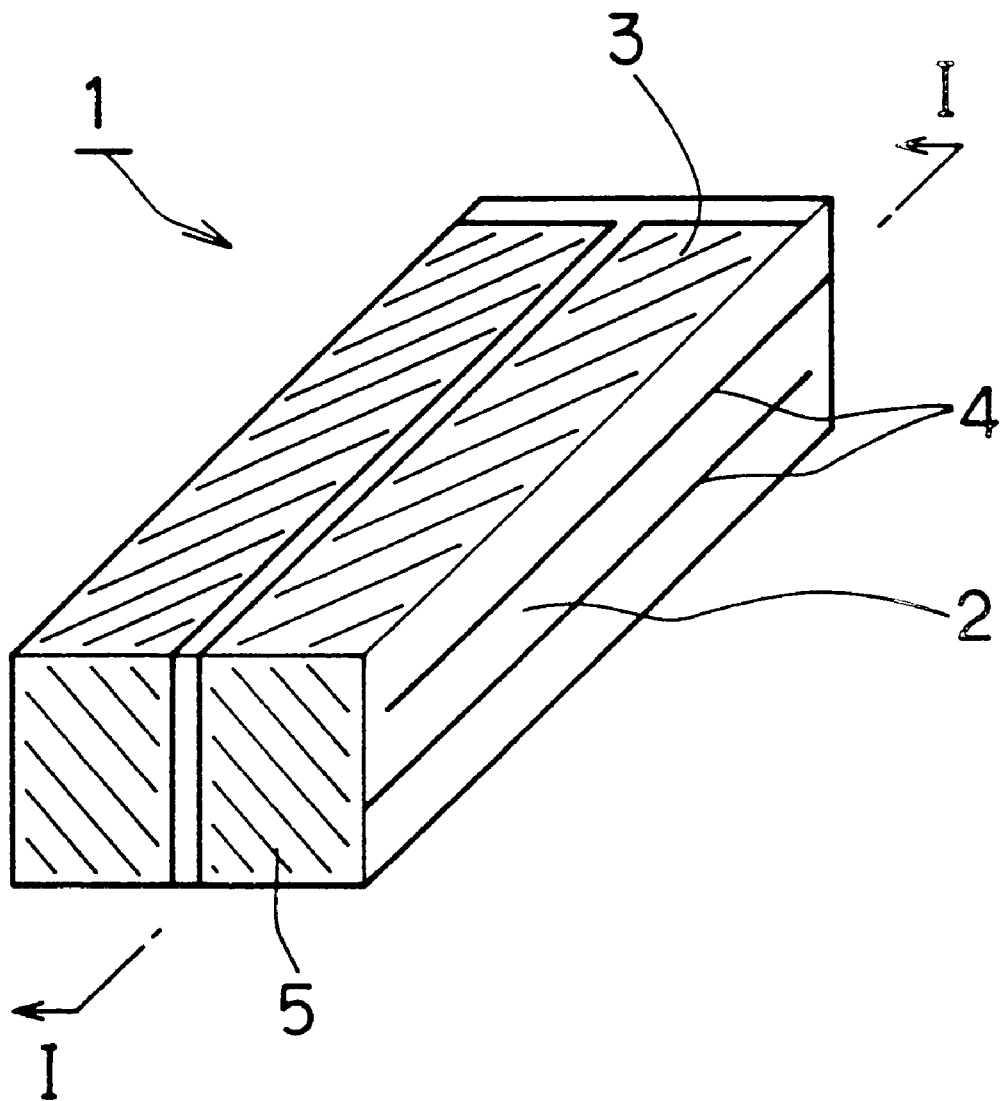
FIG. 6 is a schematic perspective view of a member for a laminated acceleration sensor according to the present invention.

Then, after cutting the laminated body into pieces at cutting planes 9 as shown in FIG. 5, the pieces are fired at 1100° C. and electrodes are applied on the side faces, thus obtaining the member for a laminated acceleration sensor. FIG. 6 shows a schematic perspective view of the obtained member for a laminated acceleration sensor. FIG. 1 mentioned above is a cross-sectional view in the laminating direction including a line I—I in FIG. 6 seen from the direction shown by arrows.

By using the manufacturing method of the present invention, the conductor sections (electrodes) can be arranged on both the upper and the lower surfaces of the device with high accuracy without using a complicated method such as back printing. As shown in FIG. 1, a member for a laminated acceleration sensor in which the difference in level between the conductor section 3 and the section other than the conductor section is smaller than the thickness of the conductor section 3 on each surface can be obtained. Moreover, since the conductor sections on both the upper and the lower surfaces can be formed during the laminating process, the manufacturing costs can be reduced compared to that when forming the conductor sections individually.

According to the manufacturing method of the present invention, by contriving the structure of the electrode pattern in the member for a laminated acceleration sensor, the polarization can be conducted before cutting the laminated body into pieces. Therefore, it is not necessary to polarize the pieces one by one as conventional piezoelectric devices, thus greatly reducing the number of processes in manufacturing.

In the member for a laminated acceleration sensor of the present invention obtained by the manufacturing method described above, the difference in level between the conductor section (electrode) 3 and the section other than the conductor section is smaller than the thickness of the conductor section 3 as shown in FIG. 1. Therefore, terminal electrodes are difficult to be stripped off and the electrode strength is high compared to members obtained by conventional methods. When polishing the surfaces of a member in order to adjust its thickness, it was difficult to obtain a uniform thickness in a conventional structure, because only conductor sections (electrodes) on the surfaces were polished in the first place. When matching the height of a non-electrode section, the conductor section became very thin. On the other hand, when trying to keep the thickness of the conductor section, the difference in level between the conductor section and the section other than the conductor section could not be eliminated. However, in the member for a laminated acceleration sensor of the present invention mentioned above, since the difference in level between the conductor section and the section other than the conductor section is smaller than the thickness of the conductor section from the beginning, the problem that only the conductor section on the surface becomes thin does not happen. Consequently, it is easy to polish the surface to obtain a uniform thickness.

Figure 7:
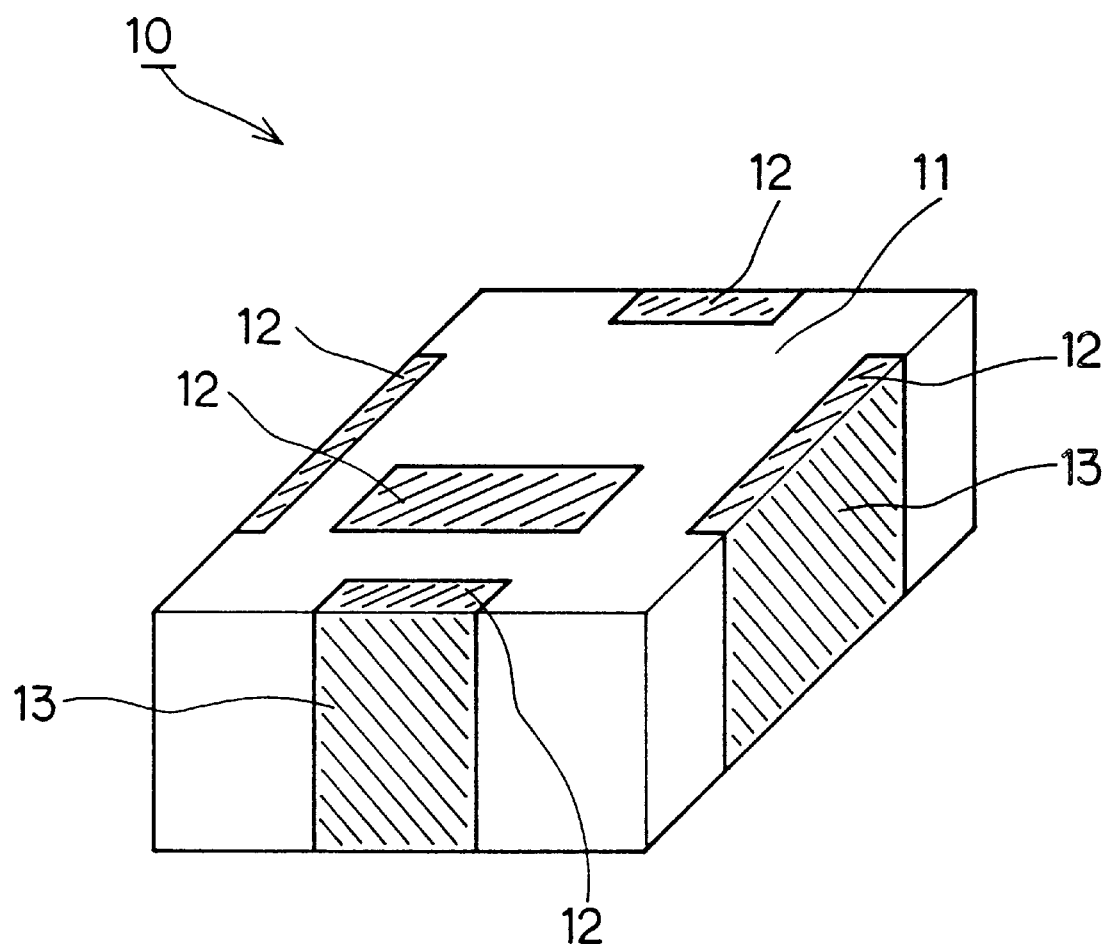
FIG. 7 is a schematic perspective view of a laminated band-pass filter according to the present invention.

According to the same manufacturing method as mentioned above, as shown in FIG. 7, a laminated band-pass filter 10 in which dielectric ceramics 11 are used for the ceramic portion also can be obtained. In this example, silver is used for conductor sections 12 on upper and lower surfaces, but the material is not limited to this. In this laminated band-pass filter, the difference in level between the conductor section (electrode part) 12 and the section other than the conductor section on each of the upper and the lower surfaces is small and the terminal strength is high. In this example, side electrodes 13 are formed on the side faces. The laminated band-pass filter shown in FIG. 7 can be applied to various types of filters such as a stripline type filter and a LC type filter.

The invention may be embodied in other forms without departing from the spirit or essential characteristics thereof The embodiments disclosed in this application are to be considered in all respects as illustrative and not restrictive, the scope of the invention is indicated by the appended claims rather than by the foregoing description, and all changes which come within the meaning and range of equivalency of the claims are intended to be embraced therein.

What is claimed is:

1. A laminated ceramic device formed by laminating ceramics and conductive metals, wherein the laminated ceramic device has uppermost and lowermost surfaces, a conductor section and a section other than the conductor section on at least one of its uppermost and lowermost surfaces, the conductor section is at a first level and the section other than the conductor section is at a second level wherein the first level and the second level are different and the difference between the first level and the second level is smaller than the thickness of the conductor section.

2. The laminated ceramic device according to claim 1, wherein the ceramics are dielectric ceramics.

3. The laminated ceramic device according to claim 2, wherein the dielectric ceramics have a specific inductive capacity of at least 10.

4. The laminated ceramic device according to claim 1, wherein the ceramics are piezoelectric ceramics.

5. A laminated ceramic device formed by laminating ceramics and conductive metals, wherein the laminated ceramic device has uppermost and lowermost surfaces, a conductor section and a section other than the conductor section on each of its uppermost and lowermost surface, and on each of the uppermost and lowermost surfaces the conductor section is at a first level and the section other than the conductor section is at a second level, wherein the first level and the second level are different and the difference between the first level and the second level is smaller than the thickness of the conductor section.

6. The laminated ceramic device according to claim 5, wherein the ceramics are dielectric ceramics.

7. The laminated ceramic device according to claim 6, wherein the dielectric ceramics have a specific inductive capacity of at least 10.

8. The laminated ceramic device according to claim 5, wherein the ceramics are piezoelectric ceramics.

* * * * *